Figure 1:
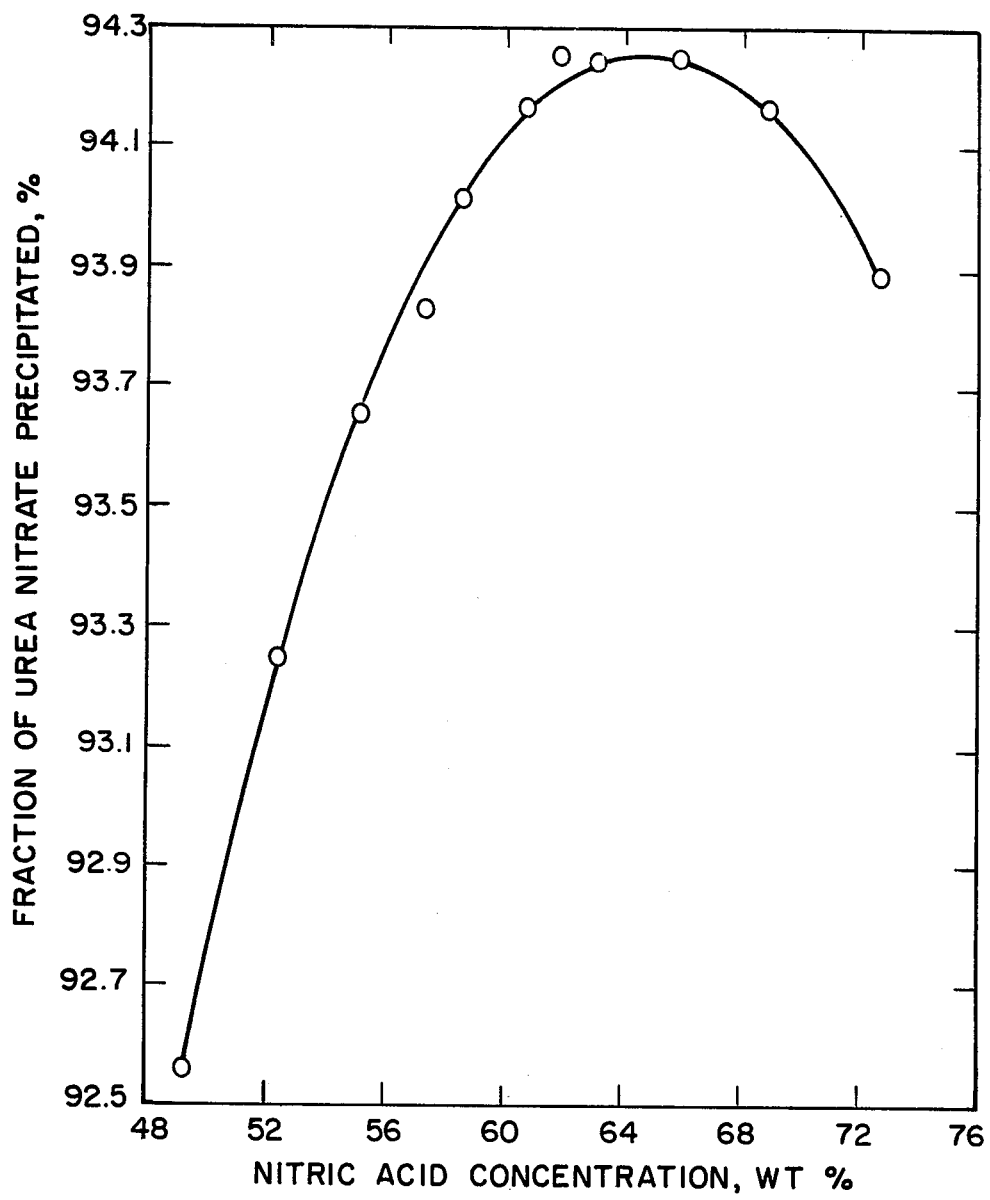

United States Patent [19]

McCullough

[11] 3,967,948
[45] July 6, 1976

[54] PURIFICATION OF PHOSPHORIC ACID WITH UREA AND NITRIC ACID

[75] Inventor: John F. McCullough, Florence, Ala.

[73] Assignee: Tennessee Valley Authority, Muscle Shoals, Ala.

[22] Filed: Sept. 29, 1975

[21] Appl. No.: 617,699

[52] U.S. Cl. .................................. 71/29; 71/30; 71/39; 71/50; 71/58; 423/321 R
[51] Int. Cl.² .................................. C05C 1/00
[58] Field of Search ............... 71/29, 30, 39, 41, 28, 71/50, 51, 58, 34; 260/555 R, 555 C; 423/321, 321 S

[56] References Cited
UNITED STATES PATENTS 3,723,086   3/1973   Poynor et al. ........................ 71/29

OTHER PUBLICATIONS

New Developments in Fertilizer Technology, TVA 10th Demostration, Oct. 1974, pp. 11 and 12.

Primary Examiner—Charles N. Hart
Assistant Examiner—Ernest G. Therkorn
Attorney, Agent, or Firm—Robert A. Petrusek

[57] ABSTRACT

My invention relates to a new method for purification of wet-process phosphoric acid with co-production of nitrogen solution. The crude acid is treated with urea by known processes to form urea phosphate free of most of the impurities in the crude acid. The urea phosphate is treated with concentrated nitric acid to form solid urea nitrate and phosphoric acid. The purified phosphoric acid is separated from the urea nitrate and withdrawn as product. The urea nitrate is washed with concentrated nitric acid and the wash soluton then is used for reaction with urea phosphate. The washed urea nitrate is then treated with ammonia and water to form nitrogen solution.

3 Claims, 3 Drawing Figures

PURIFICATION OF PHOSPHORIC ACID WITH UREA AND NITRIC ACID

The invention herein described may be manufactured and used by or for the Government for governmental purposes without the payment to me of any royalty therefor.

My invention relates to a newly developed process for the purification of wet-process phosphoric acid to yield products eminently suitable for the production of fluid fertilizers, more particularly to the purification of wet-process phosphoric acid with urea and nitric acid, and still more particularly to the purification of wet-process phosphoric acid with co-production of nitrogen solutions highly suitable for fertilizer use.

Numerous processes have been developed for the purification of wet-process phosphoric acid prepared by the acidulation of phosphate rock with sulfuric acid (A. V. Slack, Phosphoric Acid, Part II, Marcel Dekker, Inc., New York, 1968, pages 709-724). Most of the processes use organic solvents and fall into two categories depending upon whether the solvent is completely or partially miscible with the acid. Completely miscible solvents are used to precipitate the impurities from the acid as described in U.S. Pat. No. 3,764,657 and German Pat. No. 2,050,008. After separation of the precipitated impurities, the solvent is distilled from the purified phosphoric acid and reused. In addition, it is necessary to recover solvent contained in the separated impurities. Because relatively large amounts of solvent are used, the distillation consumes large amounts of energy and requires a large capital investment for equipment. Another drawback of processes using water-miscible solvents is that carbonaceous matter is not removed.

In purification processes using partially miscible organic solvents, pure phosphoric acid is extracted into the solvent and is than usually back extracted into water (R. Blumberg, Solvent Extraction Revs., 1 (1), pp 93-104, 1971; British Pat. No. 1,209,272; U.S. Pat. No. 2,880,063 and U.S. Pat. No. 2,885,265). The solvents are usually recovered by distillation from both the purified acid and the raffinate. The purified acid product usually contains less than about 45 percent $P_2O_5$ and must be concentrated for many uses. Problems with phase separations are experienced in many of the processes.

Urea phosphate and processes for its manufacture in relatively pure form from wet-process phosphoric acid have been known for many years (C. Matignon and M. Dode, Bull. Soc. Chim. France, 1934, 1114; U.S. Pat. No. 1,440,056; British Pat. No. 1,191,635; and Chem. Eng. News, Sept. 1, 1975, pp. 22). Although urea phosphate is a good fertilizer, it cannot compete economically with ammonium phosphates. Processes have been developed to prepare long-chain crystalline ammonium polyphosphates from urea phosphate but such materials are not attractive as fertilizers because of the relatively high cost (U.S. Pat. No. 3,397,035). Heretofore, the most practical way of utilizing relatively pure urea phosphate in the fertilizer industry is to convert it by pyrolysis into a highly water-soluble mixture of urea and ammonium polyphosphate for conversion to solution fertilizers that are relatively free of metallic and fluorine impurities (U.S. Pat. No. 3,713,802 and West German Pat. No. 2,308,408). Although this method of utilizing urea phosphate has many attractive features, it has two major disadvantages. One disadvantage is that a large portion of the urea is decomposed during the pyrolysis and the other is that biuret is formed as a byproduct. The biuret is sparingly soluble and limits the grade of clear solution fertilizers that can be prepared.

Nitrogen solutions are widely used as direct application fertilizers and as intermediates in the manufacture of other fertilizers. Their major constituents are urea, ammonium nitrate, and ammonia and they are prepared with grades ranging from 28-0-0 to 51-0-0 (Farm Chemicals Handbook, Meister Publishing Co., Willoughby, Ohio, 197, pp. C103).

It is an object of the present invention to provide a process for the partial or substantially complete purification of wet-process phosphoric acid to yield products suitable for the production of fluid fertilizers that do not deposit solids or gels during preparation, storage, and shipping.

Another object of the present invention is to combine the purification of wet-process phosphoric acid with known processes for the production of pure or partially pure urea phosphate from wet-process phosphoric acid.

Still another object of the present inventon is to provide improvements in known processes for the production of pure or partially pure urea phosphate from wet-process phosphoric acid.

Yet still another object of the present invention is to convert urea phosphate prepared by any means to phosphoric acid and solid urea nitrate by treatment with nitric acid.

A still further object of the present invention is to convert the urea nitrate prepared by treatment of urea phosphate with nitric acid to nitrogen solutions suitable for fertilizer use.

Yet a still further object of the present invention is to combine processes for the production of urea phosphate with the purification of wet-process phosphoric acid and co-production of nitrogen solutions.

My invention is a process for the purification of wet-process phosphoric acid with co-production of nitrogen solution. Urea phosphate prepared from wet-process phosphoric acid by known methods and free of all or most of the metallic, fluorine and carbonaceous impurities originally present in the acid is treated with concentrated nitric acid to form crystalline urea nitrate and free, concentrated phosphoric acid. The urea nitrate is separated from the phosphoric acid and washed with nitric acid to remove the mother liquor and then is neutralized with aqueous ammonia to form a concentrated solution of urea and ammonium nitrate. The concentrated phosphoric acid product is free of all or most of the impurities originally present in the wet-process acid and is highly suitable for the production of high quality, clear, solution fertilizers that do not precipitate solids during preparation, storage, and shipping. The composition of the nitrogen solution is adjusted to that of standard, commercial nitrogen solutions widely used as fertilizers or fertilizer intermediates by the addition of small amounts of urea or ammonium nitrate, as needed.

It is well known that urea reacts with wet-process phosphoric acid to form crystalline urea phosphate as in the reaction

Virtually all of the impurities originally present in the wet-process acid are either dissolved in or uniformly dispersed in the mother liquor as finely divided solids and essentially none of the impurities are entrapped within the urea phosphate crystals. Therefore, the purity of the isolated urea phosphate crystals depends upon the amount of mother liquor adhering to their surface and each impurity in the wet-process acid is removed with about equal effectiveness. It was discovered that after urea phosphate is treated with the stoichiometric amount of concentrated nitric acid, the substantial portion of the urea is converted to crystalline urea nitrate which is the only solid phase present, thus all of the phosphoric acid is liberated as in the reaction $$CO(NH_2)_2 \cdot H_3PO_4 + HNO_3 = CO(NH_2)_2 \cdot HNO_3 + H_3PO_4$$

Figure 2:
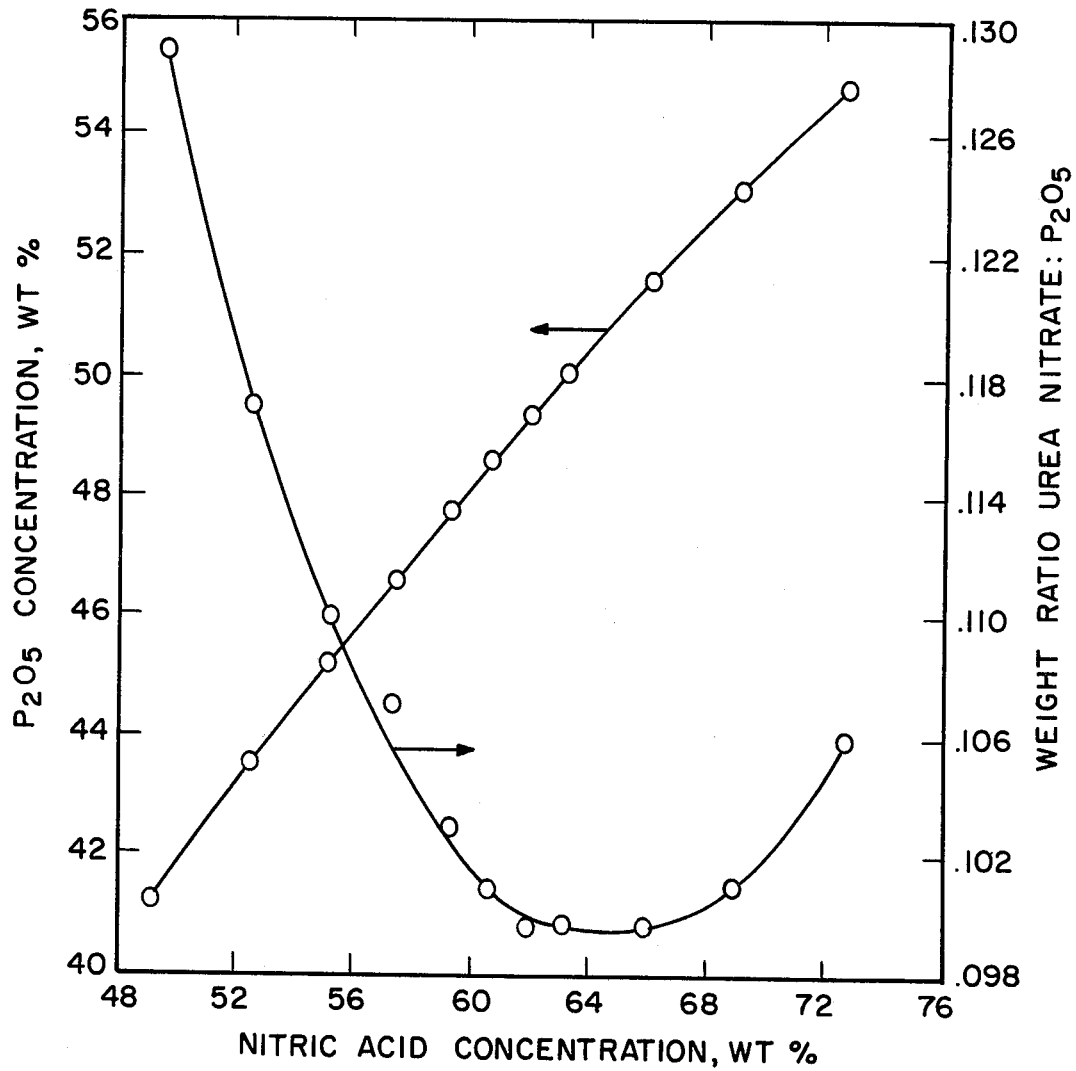

Measurements were made of the solubility of pure urea nitrate in different concentrations of reagent phosphoric acid at 25°C. The results were used to calculate the fractions of urea nitrate precipitated and the concentrations of $P_2O_5$ and urea nitrate in the liquid phases when urea phosphate is treated with the stoichiometric amount of nitric acid at different concentrations. The results from the calculations are shown in FIGS. 1 and 2. FIG. 1 shows that a maximum of about 94.2 percent of the urea nitrate is precipitated with about 64 percent nitric acid but that there is less than 2 percent difference in the amount of urea nitrate precipitated over the range of concentrations from 49 to 72 percent. FIG. 2 shows that the concentration of $P_2O_5$ in the liquid phase increases with increase in nitric acid concentration and ranges from about 41 percent at 49 percent nitric acid to about 55 percent at 73 percent nitric acid. The weight ratio urea nitrate:$P_2O_5$ in the liquid phase is not greatly affected by nitric acid concentrations in the range from 49 to 73 percent since they range from about 0.1 to about 0.13.

Urea nitrate remains as the only solid phase after urea phosphate is treated with either a deficiency or an excess of nitric acid up to at least 10 percent of the stoichiometric amount. Naturally, however, the composition of the liquid phase is affected. A deficiency of nitric acid causes a decrease in the amount of nitric acid in the liquid phase—the decrease is about 50 percent with a 10 percent deficiency. An excess of nitric acid causes a decrease in the amount of urea in the liquid phase—the decrease is about 50 percent with a 10 percent excess.

The urea nitrate crystals are easily separated from the phosphoric acid by filtration and adhering phosphoric acids are effectively washed from the crystals with concentrated nitric acid, which nitric acid can then be returned to the process. The phosphoric acid contains essentially all of the impurities present in the urea phosphate as well as dissolved urea nitrate. The small amount of urea nitrate contained in the phosphoric acid does not diminish the usefulness of the acid for fertilizer preparation and is of little economic significance because the nitrogen values are recovered in the final fertilizer products.

Although urea nitrate can be used as a nitrogen fertilizer, its most practical use is for the production of standard nitrogen solutions widely used by the fertilizer industry. Many of these materials consist of aqueous solutions of urea and ammonium nitrate and can easily be prepared by neutralizing urea nitrate with aqueous ammonia as in the reaction $$CO(NH_2)_2 \cdot HNO_3 + NH_3 \xrightarrow{H_2O} CO(NH_2)_2 + NH_4NO_3$$

with final adjustment to the composition of standard solutions with urea.

Although urea nitrate is an explosive, it is safe to work with under the conditions of my process. Violent decomposition does not occur at temperatures below 140°C, small quantities do not explode, and it is insensitive to friction and impact ["Chemistry and Technology of Explosives," Urbanski, Vol. 2, page 469, Pergamon Press Ltd., London (1965)]. In my process, urea nitrate is always present as a slurry or a wet solid and is kept at temperatures below 40°C and large amounts are not stored. Reasonable precaution must be exervised, however, to prevent it from being accidentally exposed to high temperatures.

Some advantages of my process over existing processes for the purification of wet-process phosphoric acid and for utilization of urea phosphate are:

A. Wet-process phosphoric acid is purified by the use of urea and nitric acid which are common and widely used fertilizer materials and, furthermore, substantially all of the urea and nitric acid is recovered as nitrogen solutions which also are common and widely used fertilizer materials. Nitrogen values in the urea and nitric acid not recovered as nitrogen solution are completely recovered when the phosphoric acid is processed into fertilizer products.

B. Organic solvents are not used, thus avoiding all of the problems attendant to their use.

C. Purified phosphoric acid containing more than 50 percent $P_2O_5$ is obtained directly without distillation or evaporation steps when the nitric acid concentration is 63 percent or more. In contrast, large amounts of energy are consumed in process using water-miscible solvents because all of the solvent must be recovered from the acid by distillation. Although lesser amounts of energy are consumed in processes using water-immiscible solvents, all such processes include distillation or evaporation steps for solvent recovery and/or for concentrating the product acid to the concentration directly achieved in my process.

D. Wet-process acid either containing or not containing carbonaceous matter can be used in my process, and when carbonaceous matter is present, it is removed just as effectively as is the other impurities. Carbonaceous matter is not directly removed from the crude acid in processes using water-miscible solvents. Although carbonaceous matter is mostly removed from the crude acid in processes using water-immiscible solvents, in some processes it causes considerable difficulty with solvent disengagement and in some processes acid containing carbonaceous matter is not used.

E. Another advantage of my process lies in the utilization of urea phosphate which can be prepared in pure form by simple and inexpensive processes. Although methods have been developed for converting urea phosphate into solution fertilizers and for preparing long-chain crystalline ammonium polyphosphate, no practical method has heretofore been available for converting urea phosphate to phosphoric acid with substantially complete recovery of the urea as a common and widely used commercial material. Phosphoric acid is superior to urea phosphate for the production of solution fertilizers because of the previously discussed problems and disadvantages associated with the use of urea phosphate for this purpose. In addition, phosphoric acid can be used to prepare any type of phosphatic fertilizer whereas the types of fertilizer than can be prepared from urea phosphate are limited. Another advantage of phosphoric acid is that it can be highly concentrated to superphosphoric acid, which is less costly to ship and handle than urea phosphate.

Other advantages of my process will become apparent from its detailed description.

My process utilizes wet-process phosphoric acid prepared by the acidulation of phosphate rock with sulfuric acid. The acid is treated with urea to form a suspension of urea phosphate crystals in mother liquor by known methods. The urea phosphate crystals are separated from all or part of the mother liquor either by known methods or by a novel modification of existing methods discovered during the course of my research. The modification consists of washing the urea phosphate filter cake formed by filtration or centrifugation with purified acid product to displace mother liquor adhering to the crystals. By use of a relatively large amount of wash, it is possible to displace virtually all of the impurities from the filter cake. However, a considerable portion of the wash acid passes the filter media which results in a decrease in yield of purified acid. Therefore, it is preferred not to completely displace the impurities by washing with a smaller amount of purified acid and to strike a compromise between loss of yield and increase in purity.

Because the process for converting urea phosphate and nitric acid to phosphoric acid and urea nitrate works equally well for either pure or partially pure materials, the only restrictions on purity are imposed by the end use of the product phosphoric acid and by economic considerations. Therefore, the urea phosphate may be essentially pure or it may contain the maximum fraction of the impurities originally present in the wet-process phosphoric acid that can be tolerated in some types of fluid fertilizers which may be as high as 50 percent. Generally, however, it is preferred that the urea phosphate be purified to the maximum economically feasible extent so that product phosphoric acid of maximum utility is obtained.

The isolated urea phosphate crystals are treated with the stoichiometric amount ± about 10 percent of concentrated nitric acid. Within these limits, the amount of nitric acid has no effect on the ease of operating the process or on the yield of phosphoric acid. Naturally, however, it affects the composition of the phosphoric acid product. Excess nitric acid causes the phosphoric acid to contain more water and nitrate but less urea. A deficiency of nitric acid causes the phosphoric acid to contain less water and nitrate but more urea. Generally, it is preferred to use the exact stoichiometric amount of nitric acid to achieve maximum recovery of urea as nitrogen solution with the minimum amount of nitric acid. However, in some cases, depending upon the end use of the phosphoric acid, it may be desirable to use either an excess or a deficiency of nitric acid.

Nitric acid concentrations in the range from 49 to 72 percent are suitable for use in my process. Within this concentration range, the fraction of urea precipitated as urea nitrate varies by less than about 2 percent, as shown by FIG. 1; therefore, the nitric acid concentration is of little significance from the standpoint of urea recovered as nitrogen solution. However, the concentration of $P_2O_5$ in the phosphoric acid product increases with increase in nitric acid concentration. Therefore, it is preferred to use nitric acid of as high a concentration as is available and economically feasible.

Because the reaction of concentrated nitric acid with urea phosphate is slightly exothermic, cooling must be provided to maintain the temperature of the reaction mixture below about 35°C, which is the maximum temperature for efficient operation of the process. The solubility of urea nitrate in phosphoric acid decreases with decrease in temperature; therefore, it is desirable to maintain the temperature of the reaction mixture at as low a value as is economically feasible. The reaction mixture of urea phosphate and concentrated nitric acid tends to be thick with urea nitrate crystals and is difficult to stir and handle. I found that the mixture can be fluidized so that it is easy to stir and handle by adding product phosphoric acid to increase the amount of liquid phase. The fluidity can be improved also by increasing the residence time so that the crystals have time to grow. The amount of product phosphoric acid needed for fluidization depends upon the degree of fluidity desired and factors such as residence time, temperature, and concentration of input nitric acid and may range from zero to two moles of phosphoric acid per mole of urea phosphate. Generally, however, I find that good results are obtained by adding a mole of product phosphoric acid per mole of urea phosphate when the residence time is from 15 to 60 minutes.

The urea nitrate crystals are separated from the phosphoric acid by filtration or centrifugation and the filter cake is washed with all or part of the nitric acid needed for the reaction with urea phosphate to remove adhering phosphoric acid. Naturally, it is desirable to remove as much of the phosphoric acid as is practicable; however, a small amount of phosphoric acid remaining with the urea nitrate does no harm if the amount does not exceed that which will cause the formation of ammonium phosphate crystals in the nitrogen solution that will be prepared from the urea nitrate.

Figure 3:
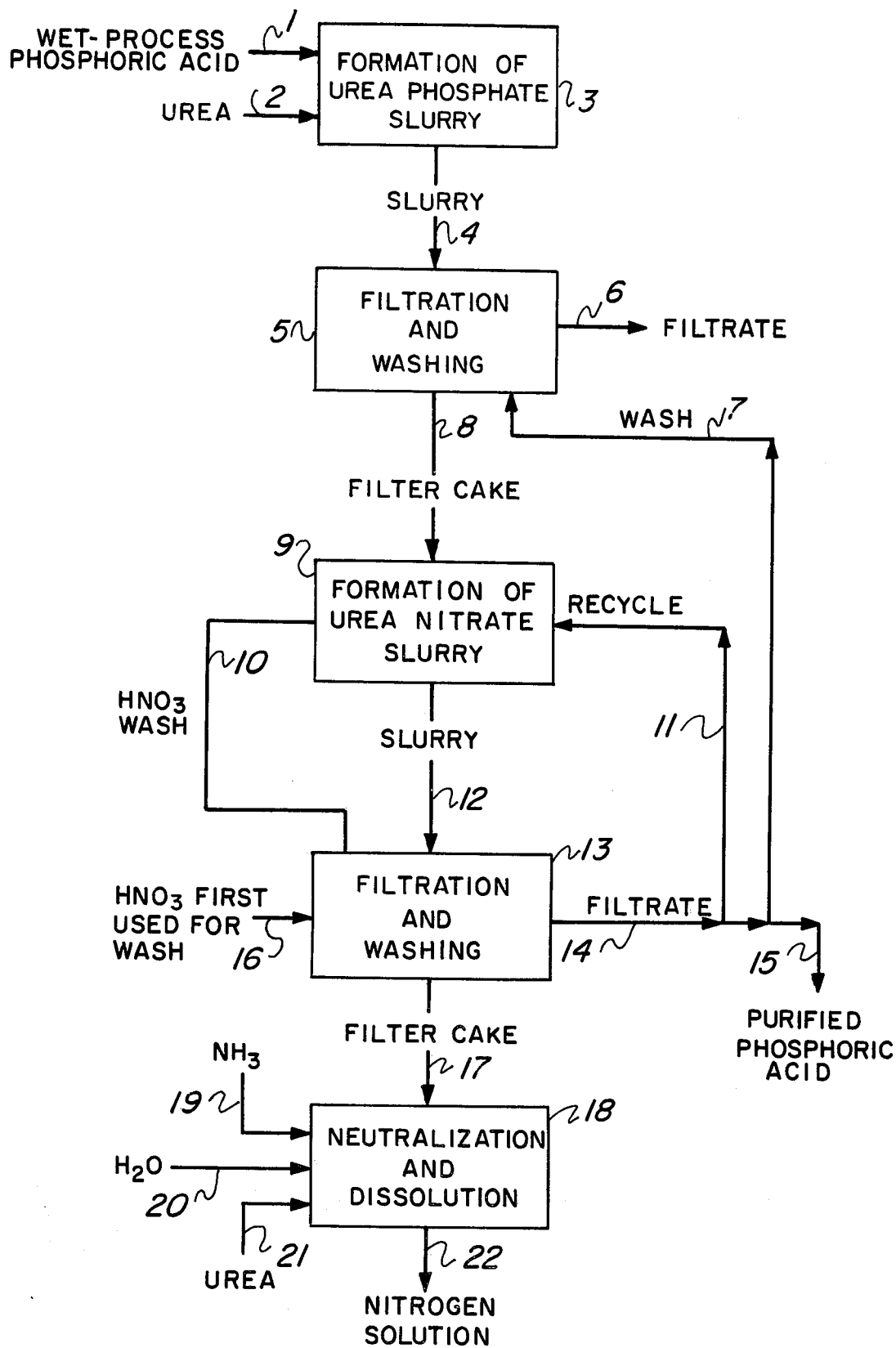

The washed urea nitrate filter cake is reacted with ammonia and water to form a solution of urea and ammonium nitrate. Urea is added as needed to adjust the composition of the solution. The reaction is carried out with efficient agitation and cooling to preclude the possibility of localized over-heating which could possibly cause decomposition of some of the nitrate. FIG. 3 is a flowsheet of a preferred embodiment of my process which generally illustrates the principles of my new and novel process for purification of wet-process phosphoric acid with co-production of nitrogen solution. Wet-process phosphoric acid and urea are introduced via lines 1 and 2 to any known process 3 for the formation of urea phosphate slurry (none of the processes are described since they are known to those skilled in the art). Urea phosphate slurry is introduced via line 4 to filtration and washing equipment 5. The filtrate which contains most of the impurities originally present in the wet-process phosphoric acid is withdrawn via line 6. From 0.15 to 0.7 pounds of purified acid product per pound of filter cake are introduced via line 7 to displace mother liquor from the filter cake. Most of the wash acid is retained by the filter cake; the rest is withdrawn with the filtrate. The washed urea phosphate filter cake is withdrawn from the filtration and washing apparatus via line 8 and delivered to reactor 9. One mole of nitric acid per mole of urea phosphate and about 0.9 pounds of recycle purified acid product per pound of urea phosphate are delivered to reactor 9 via lines 10 and 11. The nitric acid was first used to wash the urea nitrate filter cake and it contains phosphoric acid and dissolved urea nitrate. The nitric acid and the urea phosphate react to form a slurry of urea nitrate in purified phosphoric acid. The recycle phosphoric acid is used to fluidize the urea nitrate slurry. The reaction mixture is stirred and its temperature is maintained below 35°C by a cooling device, not shown. After a residence time in reactor 9 from 15 to 60 minutes, the reaction mixture consists of a slurry of urea nitrate in phosphoric acid and it is withdrawn via line 12 and delivered to filtration and washing apparatus 13. The filtrate is purified acid and is withdrawn via line 14; part is delivered to apparatus 5 via line 7 and another part is delivered to reactor 9 via line 11. The rest is withdrawn via line 15 as product. Sixty-five percent nitric acid is introduced to the process via line 16 and is first delivered to washing apparatus 13 to wash the urea nitrate filter cake. The amount of nitric acid introduced is that required for reaction with the urea phosphate in reactor 9 (a mole of nitric acid per mole of urea phosphate), plus that retained by the urea nitrate filter cake. The nitric acid wash is withdrawn from the washing apparatus 13 via line 10 and delivered to reactor 9. The washed urea nitrate filter cake is withdrawn from washing apparatus 13 via line 17 and delivered to reactor 18 where it is reacted with ammonia and water introduced via lines 19 and 20 to form a solution of urea and ammonium nitrate. Urea is added via line 21 to reactor 18 as needed for adjustment of the composition of the solution to that of standard grades. Product nitrogen solution is withdrawn from reactor 18 via line 22. The purified acid product typically contains 51 percent $P_2O_5$ and 5 percent dissolved urea nitrate and less than 5 percent of the impurities originally present in the wet-process phosphoric acid. When the wet-process phosphoric acid is black with carbonaceous matter, the purified phosphoric acid is clear amber in color.

In order that those skilled in the art may better understand how the present invention can be practiced and more full and definitely understood, the following examples are given by way of illustration and not by way of limitation.

EXAMPLE I

The urea phosphate used in this example was prepared from wet-process phosphoric acid by a continuous process developed by Tennessee Valley Authority in which the mother liquor was separated from the urea phosphate by centrifugation without washing. The urea phosphate had the following weight percent composition: $P_2O_5$ — 43.9, N — 17.1, Al — 0.09, Fe — 0.24, Mg — 0.16, F — 0.1, and $SO_4$ — 0.9. The wet-process phosphoric acid from which the urea phosphate was prepared had the following weight percent composition: $P_2O_5$ — 53.6, Al — 0.30, Fe — 0.98, Mg — 0.58, F — 0.32, and $SO_4$ — 3.5.

Two hundred thirty-one grams of urea phosphate was mixed with 222.8 grams of pure phosphoric acid containing 51.4 percent $P_2O_5$ and nearly saturated with 4.98 percent urea nitrate. 127.7 grams of 69.6 percent nitric acid was then added and the resulting fluid slurry was cooled to 20°C and held for one hour and then filtered. The filtrate weighed 358 grams and by chemical analysis had the following weight percent composition: $P_2O_5$ — 52.2, urea nitrate — 4.9, Al — 0.04, Fe — 0.12, Mg — 0.08, F — 0.05, and $SO_4$ — 0.45. When corrected for the pure phosphoric acid that it contained, the filtrate had the following weight percent composition: $P_2O_5$ — 53.0, urea nitrate 4.9, Al — 0.08, Fe — 0.26, Mg — 0.17, F — 0.11, and $SO_4$ — 0.97.

The filter cake was washed on the filter with 150 grams of 69.6 percent nitric acid. The wash passing the filter weighed 167.5 grams and by chemical analysis, had the following weight percent composition: $HNO_3$ — 46.1, urea nitrate — 2.2, $P_2O_5$ — 15.4, Al — 0.01, Fe — 0.03, Mg — 0.02, F — 0.01 and $SO_4$ — 0.11. The washed filter cake weighed 184.1 grams and by chemical analysis, had the following weight percent composition: urea nitrate — 87.5, $HNO_3$ — 4.17, $P_2O_5$ — 0.21, Al — 0.001, Fe — 0.003, Mg — 0.002, F — 0.001, and $SO_4$ — 0.11.

EXAMPLE II

Two hundred thirty-one grams of the urea phosphate used in Example I was mixed with 222.8 grams of pure phosphoric acid containing 51.4 percent $P_2O_5$ and nearly saturated with 4.98 percent urea nitrate. 161.5 grams of 55 percent nitric acid was then added and the resulting fluid slurry was cooled to 20°C and held for one hour and then filtered. The filtrate weighed 403.4 grams and by chemical analysis, had the following weight percent composition: $P_2O_5$ — 47.7, urea nitrate — 4.6, Al — 0.04, Fe — 0.12, Mg — 0.08, F — 0.05, and $SO_4$ — 0.45. When corrected for the pure phosphoric acid that it contained, the filtrate had the following weight percent composition: $P_2O_5$ — 44.0, urea nitrate — 4.6, Al — 0.09, Fe — 0.23, Mg — 0.16, F — 0.10, and $SO_4$ — 0.88.

The filter cake was washed on the filter with 150 grams of 55 percent nitric acid. The wash passing the filter weighed 161.5 grams and by chemical analysis, had the following weight percent composition: $HNO_3$ — 40.2, urea nitrate — 0.79, $P_2O_5$ — 12.2, Al — 0.01, Fe — 0.03, Mg — 0.02, F — 0.01, and $SO_4$ — 0.1. The washed filter cake weighed 189.6 grams and by chemical analysis, had the following weight percent composition: urea nitrate — 85.7, $HNO_3$ — 6.14, $P_2O_5$ — 0.25, Al — 0.001, Fe — 0.003, Mg — 0.002, F — 0.001, and $SO_4$ — <0.1.

EXAMPLE III

Two hundred thirty-one grams of the urea phosphate used in Example I was mixed with 222.8 grams of pure phosphoric acid containing 51.4 percent $P_2O_5$ and nearly saturated with 4.98 percent urea nitrate. 136.7 grams of 65 percent nitric acid was added and the resulting fluid slurry was cooled to 20°C and held for one hour and then filtered. The filtrate weighed 358.5 grams and by chemical analysis, had the following weight percent composition: $P_2O_5$ — 51.4, urea nitrate — 4.6, Al — 0.04, Fe — 0.12, Mg 0.08, F — 0.05, and $SO_4$ — 0.5. When corrected for the pure phosphoric acid that it contained, the filtrate had the following weight percent composition: $P_2O_5$ — 51.3, urea nitrate — 4.6, Al — 0.08, Fe — 0.26, Mg — 0.17, F — 0.10, and $SO_4$ — 1.06.

The filter cake was washed on the filter with 150 grams of 65 percent nitric acid. The wash passing the filter weighed 177.6 grams and by chemical analysis, had the following weight percent composition: $HNO_3$ — 43.5, urea nitrate — 0.97, and $P_2O_5$ — 16.7. The washed filter cake weighed 183 grams and by chemical analysis, had the following weight percent composition: urea nitrate — 85.7, $HNO_3$ — 6.14, $P_2O_5$ — 0.29, Al — 0.001, Fe — 0.003, Mg — 0.002, F — 0.001, and $SO_4$ — <0.1.

EXAMPLE IV 8.02 grams of urea were dissolved in 30.9 grams of 29.6 percent aqueous ammonia and the solution placed in an ice bath. Then 100 grams of the washed urea nitrate filter cake from Example III were slowly added to the cooled solution with good stirring. The resulting solution was slowly treated with anhydrous ammonia until its pH reached 5.52. The final solution was clear and chemical analysis showed that it contained 32.2 percent by weight of nitrogen. The solution remained clear and free of precipitated solids after storage at 0°C for 6 months.

EXAMPLE V

One hundred eighty-six grams of black wet-process phosphoric acid (weight percent composition: $P_2O_5$ — 53.8, Al — 0.53, Fe — 0.65, Mg — 0.16, F — 0.42 and $SO_4$ — 3.7), 84.6 grams of urea and 186 grams of mother liquor from previous preparations were combined and the mixture heated to 70°C and then allowed to cool slowly to 20°C. The resulting slurry of urea phosphate was filtered under vacuum using 250-mesh filter cloth and the filter cake was washed on the filter with 78.5 grams of simulated purified acid containing 50.8 percent $P_2O_5$ and prepared by mixing 95 parts $P_2O_5$ as reagent acid with 5 parts $P_2O_5$ as wet-process acid. By chemical analysis, the washed filter cake contained 45.9 weight percent $P_2O_5$ and 30.4 weight percent urea. 233 grams of the washed filter cake were slurried with 137 grams of the simulated purified acid described above and the slurry was then treated with 126 grams of 65 percent nitric acid (10 percent excess over the stoichiometric amount) to form a slurry of urea nitrate. The urea nitrate slurry was cooled to 20°C and held for 30 minutes then filtered. The purified acid filtrate weighed 212 grams and by chemical analysis, had the following weight percent composition: $P_2O_5$ — 48.3, urea nitrate — 3.0, $HNO_3$ — 4.0, Al — 0.03, Fe — 0.03, Mg — 0.008, F — 0.02, and $SO_4$ — 0.1. The purified acid product contained less impurities than the simulated purified acid that it contained; hence more than 95 percent of the impurities originally present in the wet-process phosphoric acid was removed.

While I have shown and described particular embodiments of my invention, modifications and variations thereof will occur to those skilled in the art. I wish it to be understood, therefore, that the appended claims are intended to cover such modifications and variations that are within the true scope and spirit of my invention.

What I claim as new and desire to secure by Letters Patent of the United States is:

1. A process for the partial or essentially complete purification of wet-process phosphoric acid by use of urea and nitric acid with co-production of nitrogen solution suitable for fertilizer use, which comprises the steps of:
    1. mixing wet-process phosphoric acid with about stoichiometric amounts of urea to thereby prepare urea phosphate, said urea phosphate containing 50 percent or less of the impurities in the wet-process acid;
    2. mixing said urea phosphate with nitric acid while maintaining the temperature of the resulting slurry of urea nitrate in phosphoric acid below 35°C for a period of time from 15 to 60 minutes; wherein for each mole of urea in the urea phosphate, 0.9 to 1.1 moles of nitric acid is used and the concentration of said nitric acid is in the range from 49 to 72 percent by weight;
    3. separating the phosphoric acid from the solid urea nitrate in said slurry as product;
    4. washing the solid urea nitrate with nitric acid of the same concentration as used in step (2) supra and subsequently using the nitric acid wash solution for reaction with urea phosphate in step (2); and
    5. treating the washed urea nitrate with ammonia and water to form a nitrogen solution consisting of urea and ammonium nitrate.

2. A process according to claim 1 wherein up to a mole of the purified phosphoric acid product per mole of urea phosphate is recycled back to the slurry of urea nitrate.

3. A process according to claim 1 wherein the urea phosphate is washed with purified phosphoric acid product.

* * * * *